United States Patent [19]

Gebhardt

[11] 4,167,353
[45] Sep. 11, 1979

[54] DISPLAY DEVICE

[75] Inventor: James L. Gebhardt, Roswell, Ga.

[73] Assignee: The Mead Corporation, Dayton, Ohio

[21] Appl. No.: 923,914

[22] Filed: Jul. 12, 1978

[51] Int. Cl.² .............................................. F16B 9/02
[52] U.S. Cl. .................................... 403/231; 403/171; 220/80
[58] Field of Search ................ 403/231, 172, 176, 171, 403/217, 219; 248/188, 188.8; 220/80; 108/153, 155; 312/263, 257 R

[56] References Cited

U.S. PATENT DOCUMENTS

| 1,238,186 | 8/1917 | Paroly | 220/80 |
| 1,252,489 | 1/1918 | Pearson | 220/80 |
| 2,167,525 | 7/1939 | Rosendale | 403/172 |
| 2,991,856 | 7/1961 | Bewey | 220/80 |
| 3,353,854 | 11/1967 | Hansen | 403/171 |

FOREIGN PATENT DOCUMENTS 1065942  4/1967  United Kingdom ...................... 220/80

Primary Examiner—Andrew V. Kundrat
Attorney, Agent, or Firm—Walter M. Rodgers; Walter A. Rodgers

[57] ABSTRACT

A display device includes a vertical corner post (1) to which a pair of horizontally disposed header panels (2) are secured at their ends by means of a plurality of support tabs (28,29) struck from a pair of support strips (10,13) connected respectively through junction strips (6,7) to a pair of interconnected corner strips (3,5), the support strips being in substantially normal relation to each other, a plurality of support apertures (26,27) formed in a support panel (20) interconnected by inwardly offset junction panels (18) and double back end panels (16) with the adjacent end edge of the header panels so that insertion of the support tabs into the support apertures forms support means for the header panels, and a locking tab (31) formed on a support strip and inserted into a locking aperture (30) formed on the support panel to secure the panels in an interlocked relationhsip.

7 Claims, 4 Drawing Figures

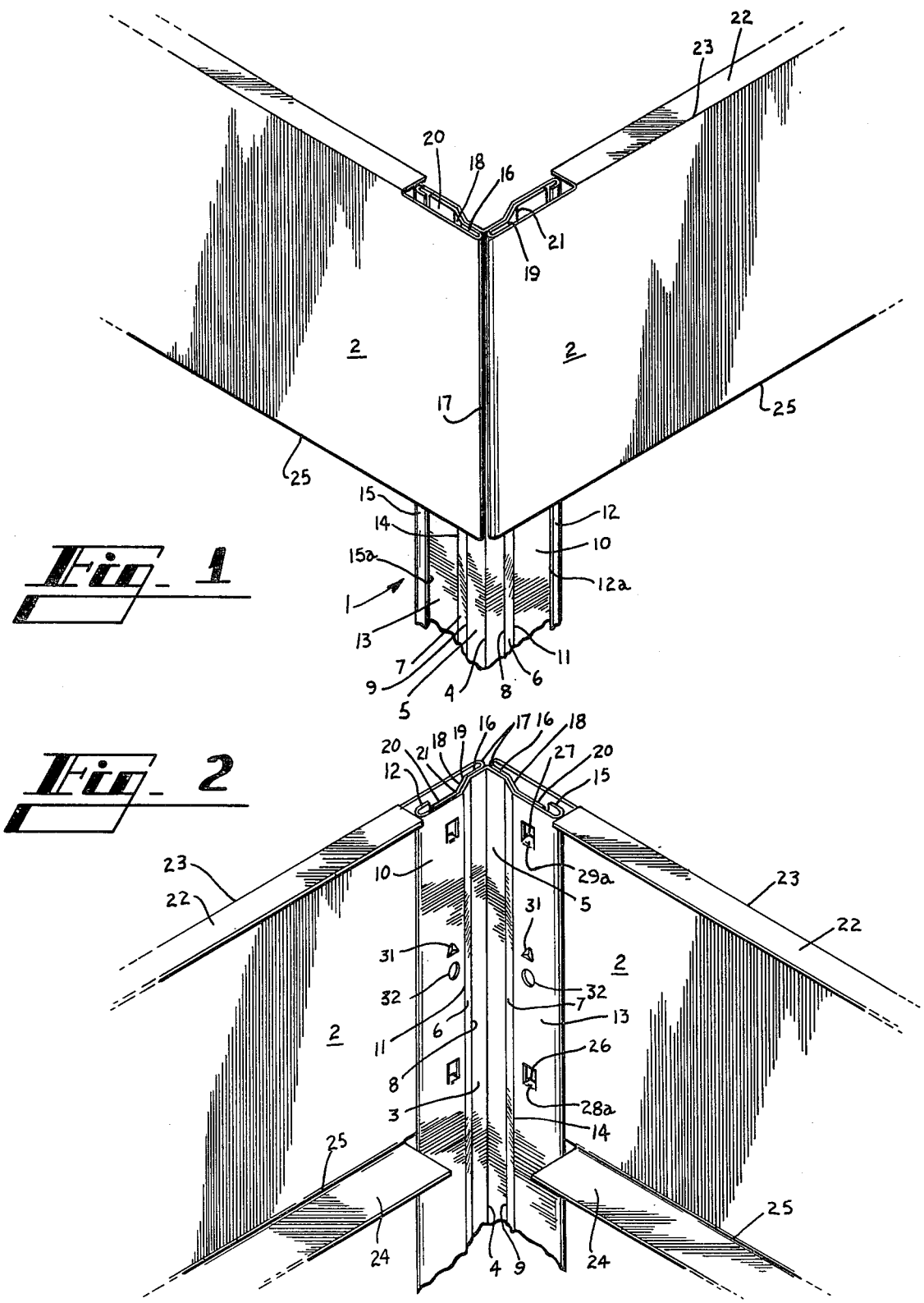

DISPLAY DEVICE

TECHNICAL FIELD

This invention relates to display devices and more particularly to means for interlocking horizontally disposed header panels with vertically disposed corner posts in display devices primarily intended for use in retail outlets such as supermarkets and the like.

BACKGROUND ART

Horizontally disposed header panels, for example, are interconnected with vertically disposed posts by bolts, screws, and rivots. Of course, such interconnecting means is satisfactory as a structural device but ordinarily requires substantial assembly time and in many instances these structures are not readily disjointable.

A support post structurally similar in many respects to the post forming a part of this invention is dislcosed in U.S. Patent Application Ser. No. 852,945 filed Nov. 18, 1977, which is a continuation of U.S. Patent Application Ser. No. 685,519 filed May 12, 1976, owned by the assignee of this invention and now abandoned.

U.S. Patent Application Ser. No. 870,847 filed Jan. 19, 1978, also owned by the assignee of this invention, discloses disjointable coupling means for interconnecting horizontally disposed header and base panels to vertically disposed corner posts.

According to this invention, in one form, a support strip forming a part of a corner post is provided with a plurality of outwardly and upwardly projecting support tabs and at least one outwardly projecting locking tab all of which are arranged to be inserted into a plurality of support apertures and at least one locking aperture formed in a support panel disposed in flat face contacting relation with the support strip so as to form a disjointable interlock between a header panel to which the support panel is affixed and a vertical post formed in part by the support strip. The support strip is interconnected with a corner strip via a junction strip and the support panel is interconnected with the end edge of the header panel through an inwardly offset junction panel and a double back end panel so that a sturdy braced interconnection is formed. Since the support strips and associated junction and corner strips are parts of a corner post, duplicate parts are fixed in position in generally normal relation with respect to similar structure which affords disjointable connecting means for a second header panel disposed in substantially normal relationship with the first header panel.

By the invention substantial stability is achieved in a disjointable structure and exposed panel edges are either covered or disposed in inaccessible dispositions.

BRIEF DESCRIPTION OF DRAWINGS

In the drawings

FIG. 1 is a fragmentary perspective view from outside of a pair of header panels shown in assembled relation and mounted on a corner post;

FIG. 2 is a view similar to FIG. 1 but which is taken from the inside;

BEST MODE FOR CARRYING OUT THE INVENTION

Figure 3:
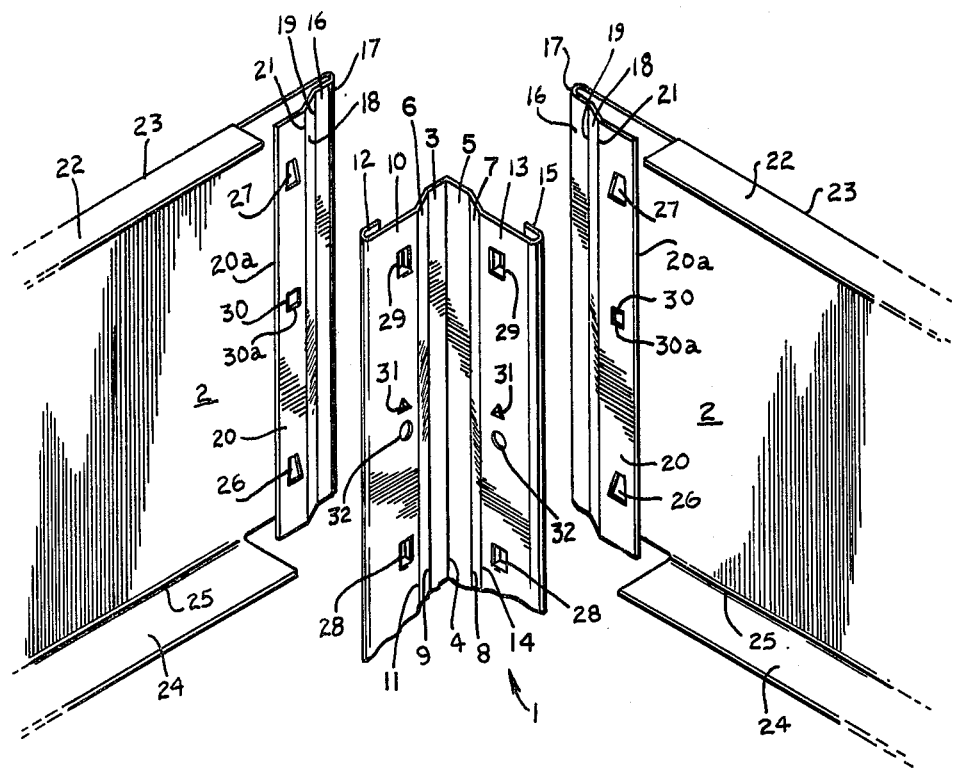
FIG. 3 is a view similar to FIG. 2 but which shows the parts in exploded condition.
Figure 4:
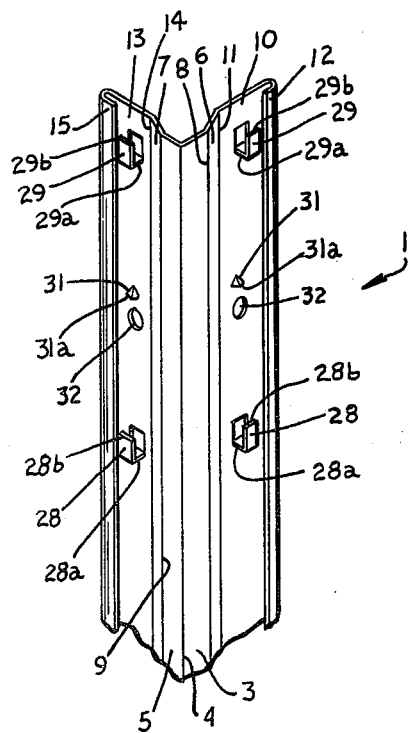
FIG. 4 is a fragmentary detailed view of a corner post formed according to this invention.

In the drawings, the numeral 1 generally designates a corner post formed according to the invention while the numeral 2 designates a header panel.

Corner post 1 includes a corner strip 3 which is secured along edge 4 with a corner strip 5. Corner strips 3 and 4 are disposed in substantially normal relation to each other and are vertical. Secured to the inner edges of corner strips 3 and 5 are a pair of junction strips 6 and 7 which are substantially parallel to each other. The junction between corner strip 3 and junction strip 6 is indicated by the numeral 8 while the junction between corner strip 5 and junction strip 7 is designated by the numeral 9. Support strip 10 is secured to edge 11 of junction strip 6 and is provided with a turned over edge portion designated by the numeral 12. Similarly, support strip 13 is secured to junction strip 7 along edge 14 and is provided with a turned over edge portion 15. Turned over edge portions 12 and 15 are provided with edges 12a and 15a respectively.

Header panel 2 is provided with a double back end panel 16 which is secured integrally with the end edge 17 of header panel 2. Inwardly offset junction panel 18 is secured to double back end panel 16 along edge 19. Support panel 20 is secured along its edge 21 to the inner edge of inwardly offset junction panel 18. Support panel 20 is disposed in substantially parallel relation to the header panel 2 as is obvious from the drawings. As is apparent from FIGS. 1, 2 and 3, panels 16, 18 and 20 of both header panels 2 are disposed in nested relation respectively with the strips 3, 6 and 13 and with the strips 5, 7 and 10 when assembled as shown in FIGS. 1 and 2.

Top flange panel 22 is secured to header panel 2 along its top edge 23 while lower flange panel 24 is secured to the bottom edge 25 of header panel 2.

For the purpose of disjointably interconnecting one support panel 20 with support strip 10, a plurality of support apertures 26 and 27 are formed in support panel 20 while corresponding support tabs 28 and 29 are struck from support strip 10. It is obvious that support tabs 28 and 29 are provided with outwardly extending lower portions 28a and 29a respectively and with upwardly extending portions 28b and 29b respectively which are substantially vertically disposed and in approximately parallel relation with respect to the support strip 10. In order to connect the header panel 2 with the corner post 1, the parts are brought into coincidence in such manner that the support tabs 28 and 29 are inserted into the support apertures 26 and 27 respectively. When so arranged the weight of one header panel 2 is supported by corner post 1.

For the purpose of interlocking the parts, a locking aperture 30 is formed in support panel 20 and a corresponding locking tab 31 is struck from support strip 10 and disposed in outwardly projecting relation with respect thereto. Thus, when the support tabs 28 and 29 are inserted into the support apertures 26 and 27, locking tab 31 is supported in locking aperture 30. When this occurs, the lower edge 31a of locking tab 31 is disposed in abutment with the lower edge 30a of locking aperture 30. When so arranged, header panel 2 is interlocked in position with support strip 10 on the corner post 1. Of course a second header panel 2 is mounted on support strip 13 of corner post 1 in the same manner described above in connection with the first header panel and support strip 10.

Additionally header panel 2 and support post 1 can be painted contrasting colors. This facilitates assembly of the display whereby header panel 2 is predominately visable through the apertures formed when support tabs 28 and 29 are struck from support strips 10 and 13.

In order to disconnect header panel 2 from corner post 1, it is simply necessary to insert an uncoupling instrument into the uncoupling aperture 32 and to pry the support panel 20 outwardly relative to the support strip 10 and by this means to remove the lower edge 31a of locking tab 31 from contact with the lower edge 30a of locking aperture 30 so that the header panel 2 and parts associated therewith including support panel 20 may be elevated relative to support strip 10 and thus to disconnect the header panel 2 from corner post 1.

From the description above, it is apparent that the parts are held in stable condition when properly assembled and that such stability is due at least in part to the fact that support panel 20 is disposed in substantially flat face contacting relation with respect to the support strip 10 and because the inwardly offset junction panel 18 is disposed in substantially flat face contacting relation with respect to the junction strip 6 or 7. Furthermore, it is apparent that the structure affords a pleasing appearance as viewed from the outside. Also a structure is provided according to the invention wherein the inner edge 20a of support panel 20 is substantially covered by the associated turned over edge portion 12 or 15.

INDUSTRIAL APPLICABILITY

While this invention is primarily intended for application in conjunction with display devices used in supermarkets and in other public places, it is clear that the invention is not limited to such applications and may, for example, be employed in conjunction with shelving, with tables of various kinds, work benches, and the like.

Ordinarily, the components formed according to this invention are made of sheet metal. It is obvious, however, that other materials may be employed, such as plastic, for some or all of the components.

The embodiments of the invention in which an exclusive property or privilege is claimed are defined as follows:

1. A display device comprising a corner post having a pair of vertically disposed corner strips arranged in substantially normal relation to each other, a pair of generally parallel vertically disposed junction strips inwardly offset toward each other and respectively connected along one side edge thereof to the inner side edges of said corner strips, a pair of vertically disposed support strips respectively connected along one side edge thereof with the other side edges of said junction strips and disposed in substantially normal relation to each other, a pair of horizontally disposed header panels arranged in substantially normal relation to each other and secured at their adjacent ends to said corner post, and wherein the improvement comprises a pair of double back end panels respectively secured to the adjacent ends of said header panels and arranged in generally parallel inwardly disposed relation with respect thereto, a pair of junction panels inwardly offset toward each other and respectively secured to the inner edges of said double back end panels and disposed in generally parallel relation and in close proximity to said junction strips respectively, a pair of support panels respectively secured to the inner edges of said inwardly offset junction panels and disposed in substantially normal relation to each other and in substantially parallel relation to said support strips respectively, and interlocking means forming disjointable connections between said support panels and said support strips respectively.

2. A display device according to claim 1 wherein said interlocking means comprises a plurality of support tabs formed on said support strips and a plurality of corresponding support apertures formed in said support panels in which said support tabs are respectively disposed.

3. A display device according to claim 2 wherein at least one locking tab is formed on each of said support strips and at least one corresponding locking aperture is formed in each of said support panels in which said locking tabs are respectively disposed.

4. A display device according to claim 3 wherein at least one uncoupling aperture is formed in each of said support strips in close proximity to the associated locking tab.

5. A display device according to claim 4 wherein said uncoupling aperture is configured and disposed to receive an uncoupling instrument for prying said support strips and their associated support panels apart thereby to dislodge said locking tabs from said locking apertures respectively.

6. A display device according to claim 1 wherein outwardly offset turned over edge portions are formed on the outer edges of said support strips and arranged in overlapping relation with the inner edges of said support panels respectively.

7. A display device according to claim 1 wherein said support panels and said support strips are different colors.

* * * * *